United States Patent
Quach

(10) Patent No.: US 7,469,259 B2
(45) Date of Patent: Dec. 23, 2008

(54) SYSTEM AND METHOD FOR EMPLOYING AN EXTENDED BOUNDARY LOOKUP TABLE

(75) Inventor: Tony Quach, Anaheim, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 246 days.

(21) Appl. No.: 11/463,880

(22) Filed: Aug. 10, 2006

(65) Prior Publication Data
US 2008/0040319 A1     Feb. 14, 2008

(51) Int. Cl.
*G06F 17/30* (2006.01)
(52) U.S. Cl. .................. 707/104.1; 707/1; 358/2.1; 382/300
(58) Field of Classification Search .............. None
See application file for complete search history.

(56) References Cited

U.S. PATENT DOCUMENTS

| | | | | |
|---|---|---|---|---|
| 4,918,587 A | * | 4/1990 | Pechter et al. ............. | 711/218 |
| 5,642,170 A | * | 6/1997 | Hackett et al. ............. | 348/459 |
| 5,774,601 A | * | 6/1998 | Mahmoodi ................. | 382/298 |
| 2003/0072016 A1 | * | 4/2003 | Dalrymple et al. .......... | 358/1.9 |

* cited by examiner

*Primary Examiner*—Mohammad Ali
*Assistant Examiner*—Alexey Shmatov
(74) *Attorney, Agent, or Firm*—Tucker Ellis & West, LLP

(57) ABSTRACT

The subject application is directed to a system and method for employing an extended boundary lookup table. A table of data elements in each of N addressable locations is first stored, with the value stored in the Nth location replicated in a terminus data element storage location. Address data representative of address locations in the table is then received and used to retrieve a first data point and a second data point, where the first data point and the second data point are located in consecutive addresses in the table. The data points are then communicated to an interpolator. When the first data point corresponds to the Nth storage location, the second data point corresponds to the terminus data element storage location.

15 Claims, 5 Drawing Sheets

SYSTEM AND METHOD FOR EMPLOYING AN EXTENDED BOUNDARY LOOKUP TABLE

BACKGROUND OF THE INVENTION

The subject application is directed to a system and method for employing an extended boundary lookup table. More particularly, the subject application is directed to a system and method for improving throughput in lookup table based conversions which tolerate input values that are out of table range.

Many systems employ lookup tables to allow for conversion of input values to corresponding output values. Lookup tables are used to output values such as physical characteristics associated with known physical systems in which inputs are empirically related to known, corresponding output values. Such tables are typically populated with values at discrete intervals. When an input value does not correspond with a table entry, it typically falls between entries that are available. In these instances, it is frequently desirable to complete an interpolation between bordering values to achieve a reasonable approximation of a corresponding output. Linear interpolation is commonly used, wherein two values define a line, and an interpolated value is calculated to be a value along that line, usually at a center point. While many physical properties have a relationship defined by a continuous function, assuming linear properties between discrete points is typically acceptable, and yields better results than if values are taken at a neighboring point of a predefined value.

Imaging systems, such as color imaging systems, frequently translate descriptions between color spaces. By way of example, many imaging systems will act in an additive color space, such as Red-Green-Blue ("RGB") during image acquisition or processing. Output devices, such as laser printers or ink jet printers, typical render images in subtractive color spaces, such as Cyan-Magenta-Yellow-Black ("CMYK"). Translation between these color spaces is frequently done with the use of a lookup table, which process is enhanced by use of interpolation. Robust lookup table based conversion systems are able to handle situations where input values are out of lookup table range. In such systems, a test of each incoming value is made to determine whether it is in lookup table range. Such testing is time consuming, which is particularly problematic when thousands of conversions are completed as is frequently required in an image rendering operation.

Therefore, there is a need for a lookup table system and method that is able to handle out of range values, and avoids the necessity of completing a time consuming test of each input values. The subject application overcomes the above noted problems and provides a system and method for employing a lookup table having an extended boundary.

SUMMARY OF THE INVENTION

In accordance with the subject application, there is provided a system and method for employing a lookup table having an extended boundary.

Further, in accordance with the subject application, there is provided a system and method for improving throughput in lookup table based conversions which tolerate input values that are out of table range.

Still further, in accordance with the subject application, there is provided a system and method that is able to handle out of range values, and avoids the necessity of completing a time consuming test of each input values.

Still further, in accordance with the subject application, there is provided a system for employing an extendable boundary lookup table. The system includes a data storage adapted for storing a table of data elements in each of N addressable data storage locations, where N is an integer greater than 1. The data storage also includes a terminus data element storage location adapted for storing a replication of a value stored in the Nth storage location. The system further comprises address input means adapted for receiving address data and means adapted for retrieving a data point from the data storage at a location in accordance with received address data. The system also includes means adapted for retrieving a second data point from a corresponding location in the data storage to that specified by the address data and means adapted for communicating the first data point and the second data point to an associated interpolator such that the first data point and the second data point are of equal value when the address data corresponds to the Nth storage location.

In one embodiment, N equals $2^M$, wherein M is an integer greater than 1, such that the terminus data element storage location is $2^M+1$.

In another embodiment, the addressable data storage locations include color conversion data. In this embodiment, the system further includes means adapted for receiving a series of color values corresponding to an image defined in a first color space and means adapted for communicating a received series of color values to the address input means such that a series of first and second data point pairs are communicated to the interpolator. In addition, in such embodiment, the interpolator includes means adapted for receiving the series of first and second data point pairs so as to generate output color values defined in a second color space therefrom. Preferably, the interpolator includes means adapted for generating output color values in accordance with a linear interpolation between first and second data point pairs. Also, preferably the first and second data points are storage locations having consecutive addresses.

Still further, in accordance with the subject invention, there is provided a method for employing an extended boundary lookup table in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for employing a lookup table having an extended boundary. In particular, the subject application is directed to a system and method for improving throughput in lookup table based conversions which tolerate input values that are out of table range. More particularly, the subject application is directed to a system and method that is able to handle out of range values, and avoids the necessity of completing a time consuming test of each input values. Preferably, the subject application is directed to a system and method for employing an extendable boundary lookup table. It will become apparent to those skilled in the art that the system and method described herein are suitably adapted to a plurality of varying fields employing lookup tables, including, for example and without limitation, document processing, statistics, empirical analysis, aviation, scientific study, demographics, or the like. The preferred embodiment, as illustrated in FIG. 1, depicts a document processing field for example purposes only and is not a limitation of the subject application solely to such a field.

Figure 1:
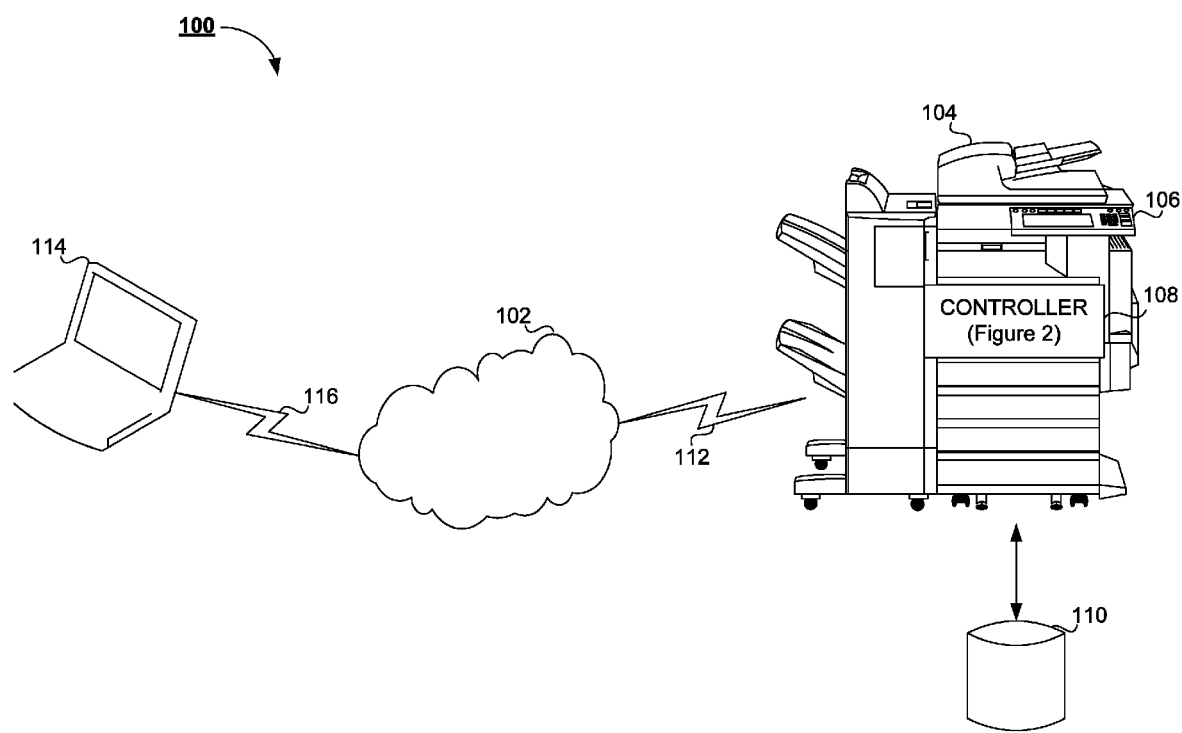
FIG. 1 is an overall diagram of the extended boundary lookup table system according to the subject application.

Referring now to FIG. 1, there is shown an overall diagram of the system 100 for employing an extendable boundary lookup table in accordance with the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms.

The system 100 depicted in FIG. 1 further incorporates at least one document processing device 104, represented as a multifunction peripheral device, suitably adapted to perform a variety of document processing operations. The skilled artisan will appreciate that such document processing operations include, for example and without limitation, printing, copying, scanning, facsimile, document management, electronic mail, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, an external device, or the like.

In one embodiment, the document processing device 104 is suitably equipped to receive a plurality of portable storage media, including without limitation, Firewire drive, USB drive, SD, MMC, XD, Compact Flash, Memory Stick, and the like. In the preferred embodiment of the subject application, the document processing device 104 further includes an associated user-interface 106, such as a touch-screen interface, LCD display, alphanumeric keypad, or the like, via which an associated user is able to interact directly with the document processing device 104. In accordance with the preferred embodiment of the subject application, the user-interface 106 is advantageously used to communicate information to the associated user and receive selections from the associated user. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the subject application, the document processing device 104 further incorporates a controller 108, suitably adapted to facilitate the operations of the first document processing device 104, as will be understood by those skilled in the art. Preferably, the controller 108 is embodied as hardware, software, or any suitable combination thereof, configured to control the operations of the associated document processing device 104, control the display of images via the user-interface 106, facilitate the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the extended boundary lookup table system and method of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store color transformation data, lookup table information, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The user device 114 is in data communication with the computer network 102 via a suitable communications link 116. It will be appreciated by those skilled in the art that the user device 114 is depicted in FIG. 1 as a laptop computer for illustration purposes only. As the skilled artisan will understand, the user device 114 shown in FIG. 1 is representative of any personal computing device known in the art, including, for example and without limitation, a computer workstation, a personal computer, a personal data assistant, a web-enabled cellular telephone, a smart phone, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 114 is suitably adapted to generate and transmit electronic documents, as well as document processing instructions, to the document processing device 104, or any other similar device coupled to the computer network 102.

Figure 2:
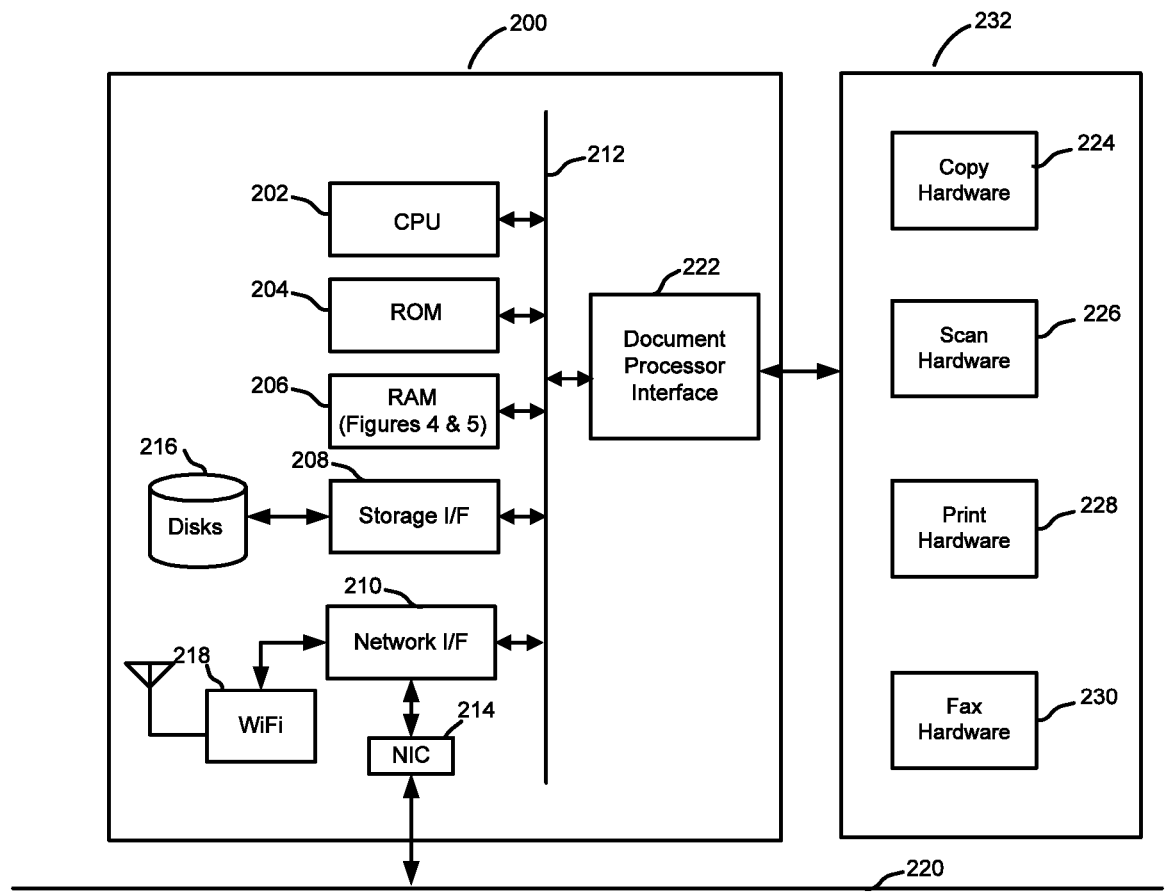
FIG. 2 is a block diagram illustrating controller hardware for use in the extended boundary lookup table system according to the subject application.

Turning now to FIG. 2, illustrated is a representative architecture of a suitable controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, illustrated in FIG. 1 as the storage device 110, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with bus 212 is a document processor interface 222. Document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that a controller suitably operates any or all of the aforementioned document processing operations. Systems accomplishing more than one document processing operation are commonly referred to as multifunction peripherals or multifunction devices.

Figure 3:
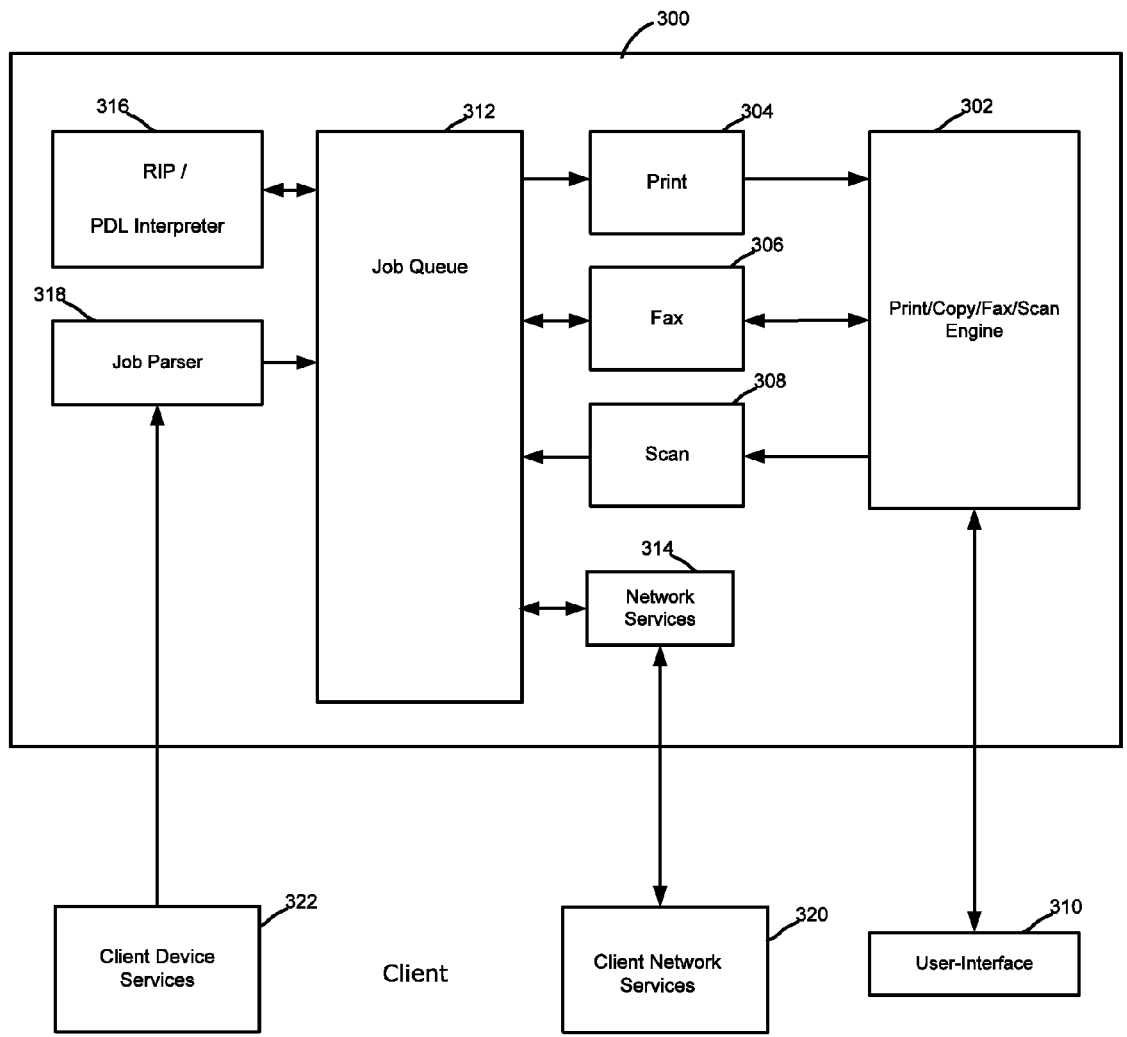
FIG. 3 is a functional block diagram illustrating the controller for use in the extended boundary lookup table system according to the subject application.

Functionality of the subject system 100 is accomplished on a suitable document processing device 104 that includes the controller 200 of FIG. 2, (shown in FIG. 1 as the controller 108), as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, the controller 108, or other general purpose computing device, facilitates the storage of a lookup table having N addressable storage locations on the data storage device 110, wherein N is an integer greater than 1. It will be appreciated by those skilled in the art that the data storage 110 is representative of the disks 216 shown in FIG. 2 and is illustrated in FIG. 1 as external to the document processing device 104 for ease of explanation only. The skilled artisan will appreciate that the N addressable storage locations is based upon the size of the lookup table being used in accordance with the subject application. For example, in the area of computer analysis, when an 8-bit lookup table is being used, there will be 256 addressable storage locations, i.e., N=256, designated 0-255; when a 12-bit lookup table is being used, there will be 4096 addressable storage locations, i.e., N=4096, designated 0-4095; when a 16-bit lookup table is being used, there will be 65536 addressable storage locations, i.e., N=65536, designated 0-65535. The skilled artisan will appreciate that the subject application is capable of implementing any variation thereof, such as, for example and without limitation, 24-bit, 32-bit, etc., lookup tables using the methodologies described herein.

The controller 108 then directs the storage of a terminus data element storage location, i.e., an N+1 addressable storage location, containing a value equal to that of the Nth storage location. For example, when N=256, the last addressable storage location in the lookup table is 255 (the 256th storage location), with the new terminus location designated 256 (the 257th storage location), wherein both locations 255 and 256 contain the same value. The controller 108 then receives address data representative of storage locations in the extended lookup table. A first data point is retrieved from the lookup table from a storage location designated by the received address data. A second data point is also retrieved from the lookup table from a storage location corresponding to that which is specified by the received address data. Thereafter, the first and second data points are communicated to an associated interpolator. It will be appreciated by those skilled in the art that the interpolator is any suitable hardware, software, or combination thereof, capable of performing interpolation.

In accordance with one embodiment of the subject application, the skilled artisan will appreciated that the storage locations corresponding to the first data point and the second data point are capable of being consecutively located in the extended lookup table. For example, when the first data point is retrieved from storage location A, the second data point is retrieved from storage location A+1. That is, when the first data point's storage location is 64, the second data point's storage location is 65. Thus, these two points are communicated to the interpolator. However, when the first data point is located at the Nth storage location, the next consecutive storage location is the added terminus data element storage location. This storage location is preferably represented by $N=2^M$, wherein M is an integer greater than 1 and the terminus location is equal to $2^M+1$.

The preceding operations will better be understood in conjunction with examples, such as use of the subject application in conjunction with color conversions in the field of document processing. In this example, the values of the N addressable storage locations are capable of corresponding to color conversion values, such as are used to convert from a first color space to a second color space. During color conversion operations, the document processing device 104 receives electronic data representative of a document to be processed. The electronic data is capable of originating at the user device 116, whereupon the data is transmitted, via the computer network 102 to the document processing device 104, received from a portable storage device at the document processing device 104, generated by the document processing device 104, e.g., scanning, or the like. The skilled artisan will appreciate that the electronic document data is typically received in an additive input color space, for example, RGB, incompatible with an output subtractive color space, for example, CMYK. Thus, the controller 108 associated with the document processing device 104, must first perform color conversion from RGB to CMYK, along with any other required formatting, processing, or the like, necessary to perform the requested document processing operation.

To begin the color conversion process, the controller 108 receives address data representative of a location or locations in the lookup table corresponding to a particular color value of an electronic image. The skilled artisan will appreciate that the lookup table is advantageously used to convert from one color space to another by providing a substitution for values in a first color space with values in a second color space. It will be understood by those skilled in the art that when the value in the first color space falls between two values in the lookup table, an interpolation must be made, so as to determine the correct value for conversion. Thus, the address data received by the controller 108 corresponds to one or more address locations, or the like, suitably represented in the lookup table.

The controller 108 then directs the retrieval of a data point from a location in the lookup table specified in the received address data. A second data point is then retrieved from the lookup table based upon a location specified by the received address data. It will be understood by those skilled in the art that when the address data corresponds to the Nth storage location, the values of the first data point and the second data point are of equal value. The controller 108 then facilitates the communication of the two data points to an interpolator via any suitable means. In accordance with one embodiment of the subject application, the interpolator is capable of implementation as a component of the controller 108, a component of the document processing device 104, or the like.

In accordance with a further, more detailed example in the field of document processing operations, the controller 108 first facilitates the storage, in the data storage device 110, of a lookup table of data elements of N addressable data storage locations, wherein N is an integer greater than 1. Preferably, the data storage locations include color conversion data enabling the conversion between a first color space and a second color space. Next, the value stored in the Nth storage location is replicated into a terminus data element storage location. Electronic document data is then received by the document processing device 104 in the form of a series of color values corresponding to an image defined in a first color space, such as RGB. Preferably, the series of color values is received as address data. The received series of color values is then communicated to the data storage 110.

A first data point is then retrieved from the data storage 110 by the controller 108 corresponding to a location specified by the address data. A second data point is also retrieved from storage 110 by the controller 108 in accordance with a location specified by the received address data. It will be understood by those skilled in the art that when the address data corresponds to the Nth storage location, the values of the first data point and the second data point are of equal value. Preferably, the first and second data points are storage locations in the lookup table having consecutive addresses. The controller 108 then directs the communication of a series of retrieved first and second data point pairs to an interpolator. It will be understood by those skilled in the art that the interpolator is any hardware, software, or suitable combination thereof, suitably adapted to perform interpolations, e.g., linear interpolation, polynomial interpolation, etc., on retrieved data points. In accordance with the subject application, the interpolator is implemented as a separate component of the document processing device 104. In one embodiment, the controller 108 is capable of functioning in the role of an interpolator, so as to perform interpolation in accordance herein.

The interpolator component then receives the series of first and second data point pairs in order to generate output color values defined in a second color space, e.g., CMYK. The interpolator then generates output color values in accordance with a linear interpolation between the first and second data points, continuing this process for each of the series of first and second data point pairs. Thus, each component, i.e., value, received corresponding to the image data is subjected to interpolation, so as to ascertain the corresponding value in a different color space. In the event that the original color space value denotes an address in the lookup table of the maximum value, i.e., location 255, the subject application provides an additional storage location, location 256, comprising the same value as that of 255. Thus, when N equals $2^M$, with M being an integer greater than 1, the terminus data storage location is $2^M+1$. When N=256, M=8, thereby resulting in a terminus data storage of $2^8+1$, or the 257th storage location, represented in the extended boundary lookup table of the subject application as storage location 256, where the first storage location is storage location 0.

Figure 4:
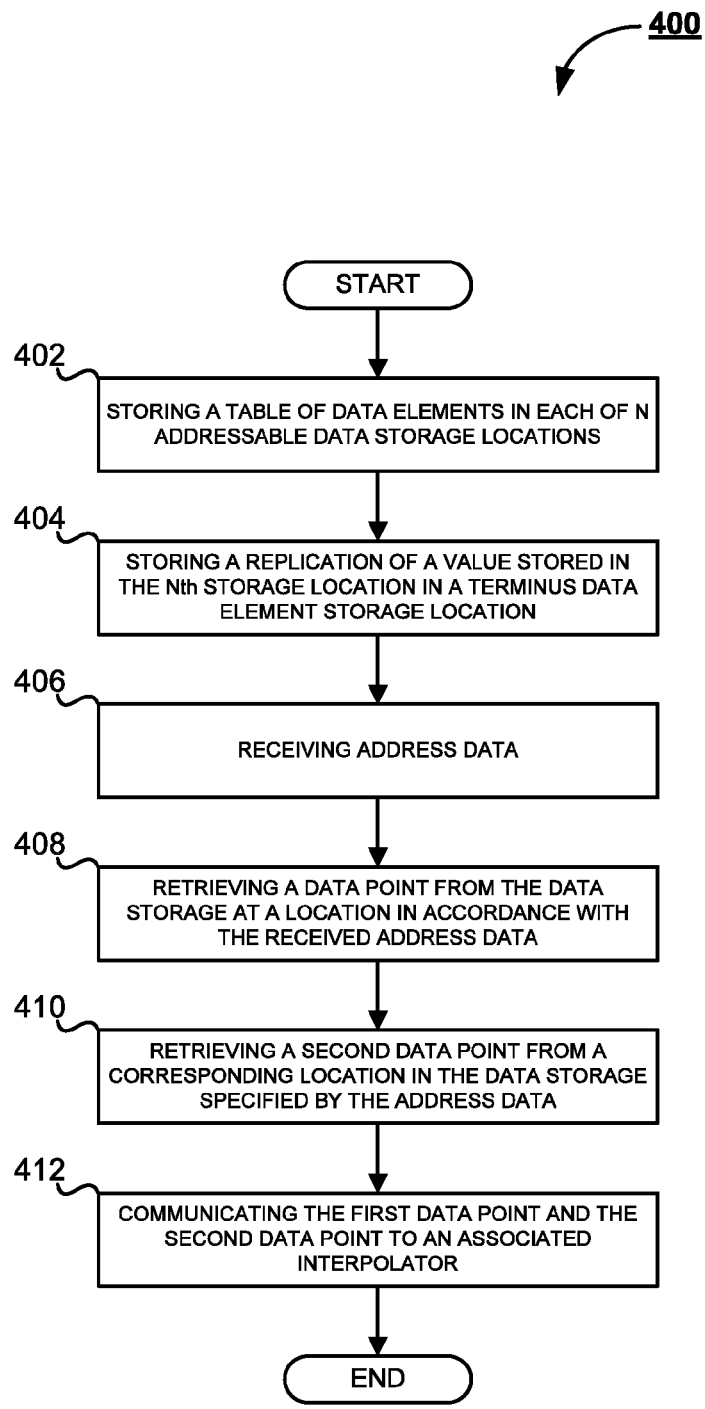
FIG. 4 is a flowchart illustrating a method for employing an extended boundary lookup table according to the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5. Turning now to FIG. 4, there is shown a flowchart 400 illustrating a method for employing an extended boundary lookup table in accordance with the subject application. Beginning at step 402, a table of data elements in each of N addressable data storage locations is stored in data storage 110.

At step 404, a replication of the value stored in the Nth storage location is stored in a terminus data element storage location. Preferably, this terminus data element storage location is represented by the $2^M+1$, wherein M is an integer greater than 1 and N=$2^M$. At step 406, address data is received, wherein the address data is representative of storage locations in the lookup table. A data point is then retrieved at step 408 from a storage location designated by the received address data. A second data is retrieved at step 410 from a corresponding storage location, as set forth by the received address data. The first data point and the second data point are then communicated to an associated interpolator at step 412, whereupon the methodology of FIG. 4 terminates.

Figure 5:
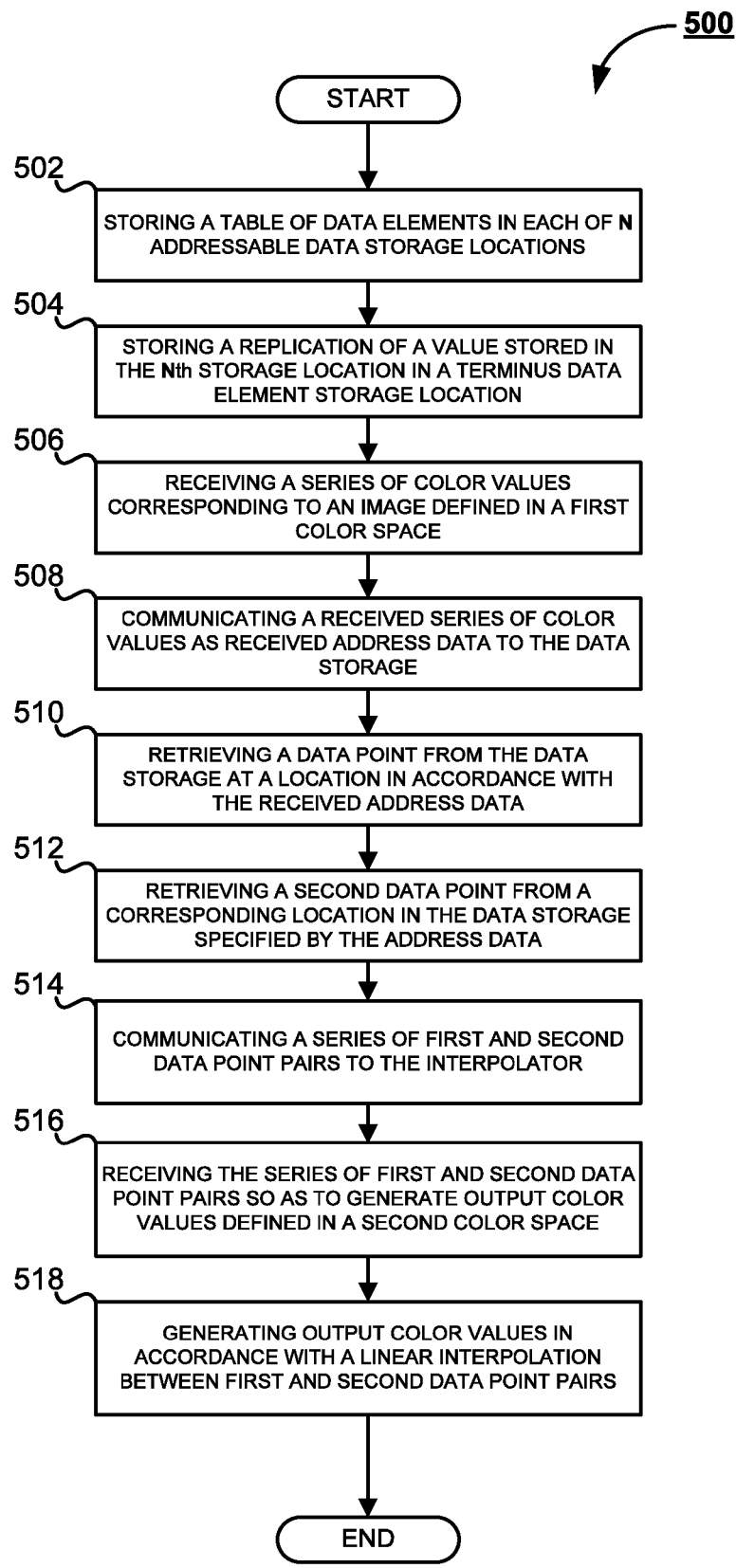
FIG. 5 is a flowchart illustrating a method for employing an extended boundary lookup table according to the subject application.

Referring now to FIG. 5, there is shown a flowchart 500 illustrating a method for employing an extended boundary lookup table in accordance with the subject application. The skilled artisan will appreciate that the methodology depicted in FIG. 5 corresponds to color space conversions, for example from RGB to CMYK, as applied in document processing operations. The use of the subject methodology in color space conversions is for illustration purposes, and the subject application is not limited only to such conversions. Beginning at step 502, a table of data elements in each of N addressable data storage locations is stored in an associated data storage, i.e., data storage device 110, wherein N is an integer greater than 1. Preferably, the data storage locations include color conversion data. At step 504, the controller 108 associated with the document processing device 104 directs the replication of a value stored in the Nth storage location and the storage of the replicated value in a terminus data element storage location. In the preferred embodiment, N=$2^M$, wherein M is an integer greater than 1 and the terminus storage location is represented as $2^M+1$.

The document processing device 104 then receives at step 506 a series of color values corresponding to an image defined in a first color space. That is, the document processing device 104 receives electronic image data from the user device 114, a scanning component associated with the document processing device 104, a portable storage device, a network storage location, or the like. This electronic image data corresponds to color image data defined in a first color space, such as RGB. The received series of color values, received as address data, is then communicated at step 508 to the data storage 110.

Color conversion is then initiated at step 510 with the retrieval of a first data point from a storage location specified by the received address data. The controller 108 then retrieves a second data point from a storage location in the lookup table corresponding to a storage location specified by the received address data at step 512. Preferably, the first data point and the second data point pair correspond to consecutive storage locations in the lookup table. Thus, when the first data point storage is located at the Nth storage location, the second data point is located at the next consecutive location, the data terminus position $2^M+1$. A series of retrieved first and second data pairs are then communicated to an interpolator at step 514. The skilled artisan will appreciate that the interpolator is capable of implementation as a component of the controller 108, a component of the document processing device 104, a function of the controller 108, or the like. The interpolator then receives the series of first and second data point pairs at step 516, so as to generate output color space values defined in a second color space. The interpolator then generates, at step 518, output color values in accordance with a linear interpolation between the first and second data points of each of the received first and second data point pairs.

It will be appreciated by those skilled in the art that the methodology described herein is used in reference to applications to color space conversions for example purposes only. The skilled artisan will appreciate that the lookup table is capable of containing any data, and the subject methodology is not limited solely to color conversions.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. An extended boundary lookup table system comprising:
   a data processing system including a central processor unit operable under software control, the data processing system including,
   a data storage adapted for storing a table of data elements consisting of N addressable data storage locations, where N is an integer greater than 1;
   the data storage including a terminus data element storage location for storing a replication of a value stored in the Nth storage location;
   means for receiving a series of color values corresponding to an image defined in a first color space;
   address input means for receiving address data for the series of received color values;
   means for retrieving a series of first data points from the data storage at a location in accordance with received address data;
   means for retrieving a series of second data points, each paired with a corresponding first data point, from a corresponding location in the data storage to that specified by the address data; and
   means for communicating the first data point and the second data point pairs to an associated interpolator such that the first data point and the second data point are obtained from the Nth storage location and the terminus data element storage location such that both values are of equal value when the address data corresponds to the Nth storage location and enables an interpolation for each of the N storage locations and generates output color values defined in a second color space therefrom.

2. The extended boundary lookup table system of claim 1 wherein N equals $2^M$, wherein M is an integer greater than 1, such that the terminus data element storage location is $2^M+1$.

3. The extended boundary lookup table system of claim 1 wherein the interpolator includes means adapted for generating output color values in accordance with a linear interpolation between first and second data point pairs.

4. The extended boundary lookup table system of claim 3 wherein first and second data points are storage locations having consecutive addresses.

5. The extended boundary lookup table system of claim 4 wherein N equals $2^M$, wherein M is an integer greater than 1, such that the terminus data element storage location is $2^M+1$.

6. A method for employing an extended boundary lookup table comprising the steps of:
   storing, in a data storage, a table of data elements in each of N addressable data storage locations, where N is an integer greater than 1;
   storing, in a terminus data element storage location of the data storage, a replication of a value stored in the Nth storage location;
   receiving a series of color values corresponding to an image defined in a first color space;
   receiving address data for the series of received color values;
   retrieving a series of first data points from the data storage at a location in accordance with received address data;
   retrieving a series of second data points, each paired with a corresponding first data point, from a corresponding location in the data storage to that specified by the address data; and
   communicating the first data point and the second data point pairs to an associated interpolator such that the first data point and the second data point are obtained from the Nth storage location and the terminus data element storage location such that both values are of equal value when the address data corresponds to the Nth storage location and enables an interpolation for each of the N storage locations and generates output color values defined in a second color space therefrom.

7. The method for employing an extended boundary lookup table of claim 6 wherein N equals $2^M$, wherein M is an integer greater than 1, such that the terminus data element storage location is $2^M+1$.

8. The method for employing an extended boundary lookup table of claim 6 further comprising the step of generating, via the interpolator, output color values in accordance with a linear interpolation between first and second data point pairs.

9. The method for employing an extended boundary lookup table of claim 8 wherein first and second data points are storage locations having consecutive addresses.

10. The method for employing an extended boundary lookup table of claim 9 wherein N equals $2^M$, wherein M is an integer greater than 1, such that the terminus data element storage location is $2^M+1$.

11. A computer-implemented method for employing an extended boundary lookup table comprising the steps of:
   storing, in a data storage, a table of data elements in each of N addressable data storage locations, where N is an integer greater than 1;

storing, in a terminus data element storage location of the data storage, a replication of a value stored in the Nth storage location;

receiving a series of color values corresponding to a first color space;

receiving address data for the series of received color values;

retrieving a series of first data points from the data storage at a location in accordance with received address data;

retrieving a series of second data points, each paired with a corresponding first data point, from a corresponding location in the data storage to that specified by the address data; and communicating the first data point and the second data point pairs to an associated interpolator such that the first data point and the second data point are obtained from the Nth storage location and the terminus data element storage location such that both values are of equal value when the address data corresponds to the Nth storage location and enables an interpolation for each of the N storage locations and generates output color values defined in a second color space therefrom.

12. The computer-implemented method for employing an extended boundary lookup table of claim 11 wherein N equals $2^M$, wherein M is an integer greater than 1, such that the terminus data element storage location is $2^M+1$.

13. The computer-implemented method for employing an extended boundary lookup table of claim 12 further comprising the step of generating, via the interpolator, output color values in accordance with a linear interpolation between first and second data point pairs.

14. The computer-implemented method for employing an extended boundary lookup table of claim 13 wherein first and second data points are storage locations having consecutive addresses.

15. The computer-implemented method for employing an extended boundary lookup table of claim 14 wherein N equals $2^M$, wherein M is an integer greater than 1, such that the terminus data element storage location is $2^M+1$.

* * * * *